Jan. 19, 1943.   C. J. HASSON   2,308,972
GUIDE PLATE APPARATUS
Filed March 2, 1942
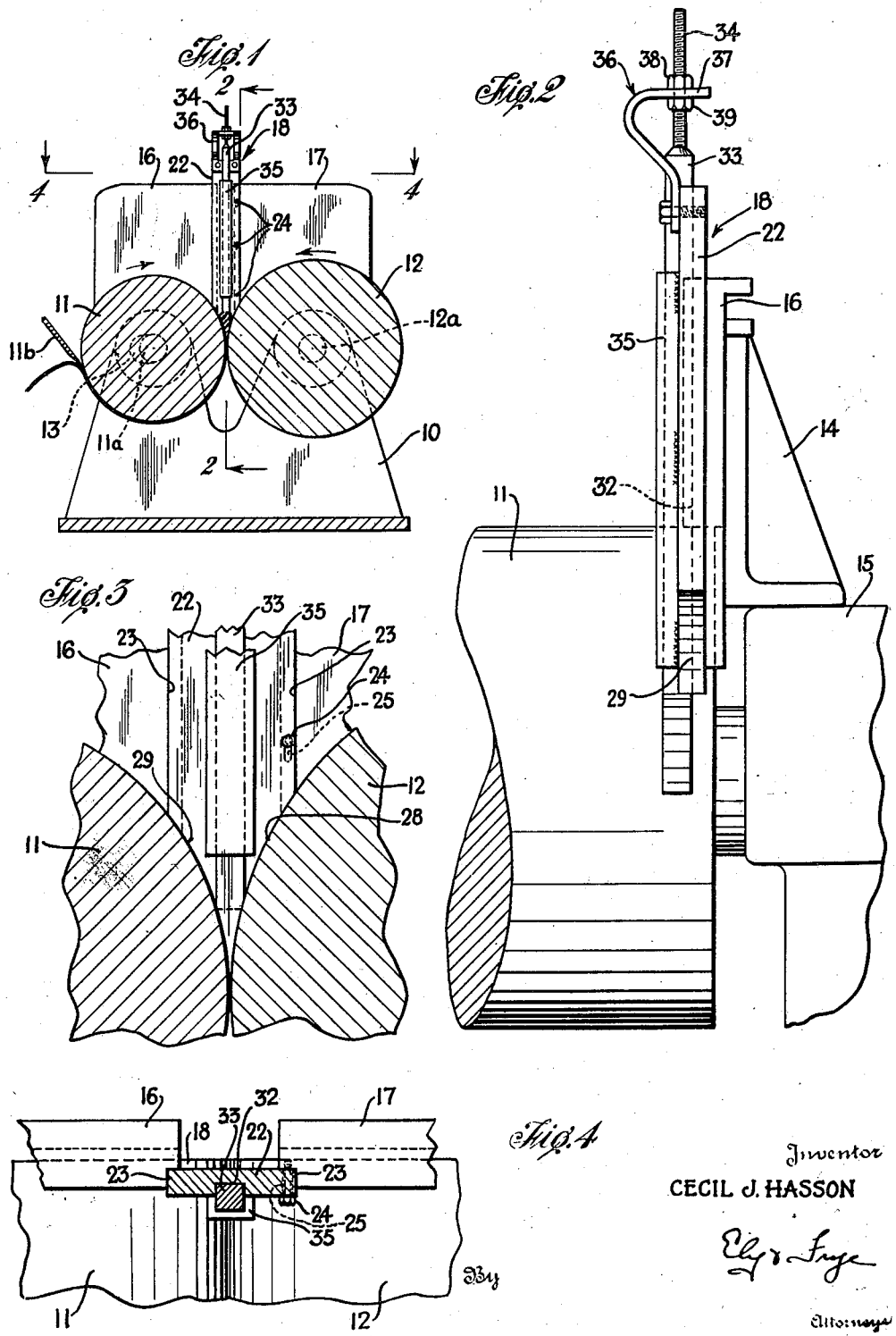
Inventor
CECIL J. HASSON Patented Jan. 19, 1943

2,308,972

UNITED STATES PATENT OFFICE 2,308,972

GUIDE PLATE APPARATUS

Cecil J. Hasson, Akron, Ohio, assignor to The Firestone Tire & Rubber Company, Akron, Ohio, a corporation of Ohio Application March 2, 1942, Serial No. 433,084

5 Claims. (Cl. 18—2)

This invention relates generally to improvements in mixing mills, and more particularly it relates to an adjustable guide plate assembly employed therein.

A primary object of the invention resides in the provision of an improved adjustable center plate of the type which is conventionally disposed intermediate a pair of fixed guide plates forming an assembly normally disposed near the end of the pair of rolls to confine plastic material being mixed thereby to the peripheral area of the rolls.

Another object is to provide improved means for adjusting the roll contacting portion of the center plate of a guide plate assembly.

A still further object is to provide improved center plate adjusting means in a device of this type which permits adjustment by an operator during operation of the mixing machine, thereby avoiding costly shut downs which have heretofore been considered unavoidable.

Other objects will be manifest as the description proceeds.

In the drawing:

Figure 1 shows in front elevation the exact guide plate assembly incorporating the invention, associated mixing rollers being shown in section.

Figure 2 shows the guide plate assembly of Fig. 1 in enlarged side elevation.

Figure 3 is an enlarged detail showing the lower end of the improved center guide plate and portions of the associated roller in section.

Figure 4 is a view taken along line 4—4 of Fig. 1, on an enlarged scale.

It is known to provide the skimming rolls of a plastic mixing mill of the general type employed in the rubber industry, with guide plate assemblies for the prevention of plastic flow over the ends of the rolls. An assembly of this type conventionally comprises a guide plate for each roll, said plates being normally disposed in a common plane in right angular relation to the axis of the rolls, each plate being of a width substantially less than the diameter of its associated roll, whereby a channel is formed between adjacent plates. The plates are normally disposed in a vertical plane and have their lower termini concavely arced for complementary engagement with the upper roll surface in bearing relation thereto. It is of course necessary to provide a closure for the channel formed between the plates and for this purpose an adjustable center plate has been positioned between the guide plates, the lower end thereof being concavely arced on opposite sides to provide a pointed terminus and adapted to completely close the space between the rolls.

The center plate is normally adjustable vertically, being locked in a position to exert pressure on the associated rolls to prevent the escape of plastic material therebetween.

Referring to the drawing, frame 10 provides support for a pair of rolls 11 and 12 mounted on shafts 11a and 12a for rotation on axes disposed in a horizontal plane, the rolls being provided with a slight crown longitudinally thereof, and adjusted to be slightly sprung apart when material is fed into the bight, to produce a thin sheet of material, for example, only a few thousandths of an inch thick.

Roll 11 is horizontally adjustable through frame slot 13, by means, not shown, to vary the magnitude of the bight. The rolls are driven in opposite directions, roll 11, for example, being driven in a clockwise direction, Fig. 1, and at a higher speed than roll 12 which rotates counterclockwise. The material to be pressed into sheet form is fed between the rolls, downwardly into the bight. The material may be either comminuted material which has been previously roll treated, or it may be in the form of noodles resulting from a previous treating stage, such as when the skimming rolls form part of rubber reclaiming equipment. After the material is formed into a thin sheet by the roll applied pressure as it passes therebetween, it adheres to the periphery of the roll having the highest speed, a fact well-known in the skimming art, which in Fig. 1 is roll 11, from which it may be removed in the form of an endless sheet by a roll contacting knife 11b.

Suitable brackets 14, supported on end portions 15 of frame 10 provide support for the main guide plates 16 and 17 and center guide plate assembly 18, said plates and plate assembly being mounted in a vertical plane. Plates 16 and 17 are concavely arcuate at the lower extremities thereof for bearing engagement with rolls 11 and 12 respectively. Center plate assembly 18 comprises a main center plate 22, snugly disposed between the main guide plates in suitable channels 23 to position the center plate over the rolls, being adjustably clamped to guide plate 17 by cap screws 24. Plate 22 is provided with elongated slots 25 to permit limited relative vertical movement between the center plate assembly 18 and guide plates 16 and 17.

Center plate 22 is provided at its lower terminus with arcuate edges 28, 29, converging toward rolls 11 and 12 respectively, said edges engaging the rolls in bearing contact therewith.

Plate 22 is provided at its inner side with a longitudinally extending center channel 32 relatively narrow in respect to the plate 22, in which a complementarily engaged bar 33 is disposed. Bar 33 is rectangular in cross section and is provided with a reduced and threaded portion 34 for a purpose later described. A housing 35, U-shaped in cross section, extends outwardly from plate 22, being preferably welded thereto, to complete with channel 32 a guideway rectangular in cross section for the rigid positioning of bar 33 in respect to the center plate 22 while allowing vertical adjustment therebetween.

At the upper end of plate 22 is mounted a bracket 36 having an apertured horizontal arm 37 through which the threaded upper end 34 of bar 33 projects. The bar portion 34 is preferably provided with threads of narrow pitch to permit vernier adjustment of the bar by means of associated nuts 38 and 39. Said nuts provide means for adjustably clamping bar 32 in a desired position relative to center plate 22 and rolls 11 and 12.

The above described center plate assembly provides a satisfactory solution to a problem of long standing in guide plate assemblies of the illustrated type. Namely, it enables adjustment of the center bar point portion independently of the center plate 22 to compensate for wear during use, the wear at the point being normally more rapid than at the shoulder portions 28, 29 of the center plate. Heretofore it was necessary to frequently remove the center plate for regrinding, a step which necessitated shut-down of the machine. Considerable time and expense have been saved by employment of the present invention.

I claim:

1. The combination with a supporting frame, a pair of skimming rolls mounted on the frame for opposite rotation about parallel axes, said rolls being peripherally engaged but adapted to be slightly forced apart by material fed therebetween, of means confining material being fed between the rolls to the peripheral area thereof, said means comprising guide plate assemblies adjacent the roll ends and including guide plates supported by the frame at opposite ends of each row with the lower ends thereof in bearing relation to the respective rolls, the plates at each end of the rolls being in juxtaposed relation with a channel therebetween, a center plate mounted on the frame and disposed within the channel, said center plate having its lower end provided with arcuate sides for engagement with both rolls, the axis of said center plate being vertically aligned with the bight of the rolls, and a vertically adjustable element having a lower end substantially narrower than the center plate with opposing concave edges converging downwardly to a point for contact with both rolls above the bight, and means for adjustably clamping said element to said center plate.

2. In a device of the character described, including a frame, the combination with a pair of rolls mounted on horizontal axes, of a guide plate assembly associated therewith, said assembly comprising a pair of guide plates mounted on the frame and having lower ends in bearing relation with said associated rolls, said plates being supported by the frame to extend upwardly therefrom, said plates being narrower than the associated rolls, and a center plate assembly disposed intermediate the guide plates to form a closure therebetween, said center plate assembly comprising a closure plate extending between the main guide plates with its lower end in bearing engagement with the rolls, and a bar, substantially narrower than the closure plate, and adjustably mounted longitudinally thereof, said bar having a lower pointed end extending into the bight of the rolls and adapted to be adjusted for bearing engagement therewith.

3. In a plastic treating device, the combination with a pair of oppositely driven horizontally disposed rolls adapted to receive a plastic composition therebetween to press the plastic into a thin sheet, said plastic being fed from a point above the rolls into the bight therebetween, of guide plate assemblies disposed adjacent the ends of the rolls to confine the plastic being treated to the peripheral surfaces of the rolls, said assemblies each comprising a pair of main plates mounted vertically and provided with concave lower ends complementarily engaging the rolls, said plates being of less width than the diameters of the respective rolls, a vertically mounted center plate disposed between the main plates to form a closure therebetween, said center plate having a lower end with opposite sides concavely arced for engagement with both rolls adjacent the bight thereof, and an adjustable bar, narrow in respect to the center plate, and mounted longitudinally of the center plate with a lower end oppositely arced to form a point extending into the roll bight in bearing engagement with the rolls to complete the closure therebetween, whereby said bar provides adjustment between the center plate assembly and the rolls independently of the center plate.

4. A center plate assembly adapted to extend intermediate a pair of rolls rotating in opposite directions to provide a bight into which plastic material may be fed to be worked by the rolls, said assembly comprising an elongated plate having an end adapted to contact the paired rolls with edges concavely arced toward a point for complementary engagement with both rolls, and a bar, narrow in respect to said plate, centrally aligned and longitudinally adjustable in respect thereto, said bar having a point with concave edges forming a pointed terminus extending into the bight between the rolls, whereby material being fed into the bight is prevented from escaping laterally of the rolls at points above the bight.

5. A device as defined by claim 4 wherein said bar extends through a guideway mounted on the center plate, and an apertured bracket is carried by the upper end of the center plate, said bar having its upper end extending through the bracket aperture, and adjustable clamp means carried by the upper end of the bar and associated with the bracket for the adjustment of the bar relative to the center plate.

CECIL J. HASSON.